US012792111B2

(12) United States Patent
Rang

(10) Patent No.: US 12,792,111 B2
(45) Date of Patent: Nov. 10, 2026

(54) AUTOMATIC EJECTION OF DISK DRIVES IN A STORAGE ENCLOSURE

(71) Applicant: Dell Products L.P., Round Rock, TX (US)

(72) Inventor: Anton Rang, Houlton, WI (US)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 19/026,035

(22) Filed: Jan. 16, 2025

(65) Prior Publication Data

US 2026/0211469 A1 Jul. 23, 2026

(51) Int. Cl.
*G06F 1/187* (2026.01)
*G06F 11/00* (2006.01)
*H01R 13/635* (2006.01)

(52) U.S. Cl.
CPC ............ *G06F 1/187* (2013.01); *G06F 11/004* (2013.01); *H01R 13/635* (2013.01)

(58) Field of Classification Search
CPC ...... G06F 1/187; G06F 11/004; H01R 13/635
USPC .................................................... 361/679.33
See application file for complete search history.

(56) References Cited

U.S. PATENT DOCUMENTS 6,654,239 B2 * 11/2003 Smith ..................... G06F 1/184 361/747
8,705,230 B2 * 4/2014 Wen ..................... G11B 33/128 361/679.38
10,126,786 B2 * 11/2018 Szeremeta ................ G06F 1/18
11,491,648 B2 * 11/2022 Wu ......................... G06F 1/186
12,339,712 B1 * 6/2025 Shipman, Jr. ......... G06F 1/1626
2013/0250746 A1 * 9/2013 Yang .................... G11B 33/124 369/53.42
2015/0108771 A1 * 4/2015 Barrett .................. E05B 47/023 292/201

FOREIGN PATENT DOCUMENTS

WO WO-2007085191 A1 * 8/2007 ............ G06F 1/187

* cited by examiner

*Primary Examiner* — Adrian S Wilson
(74) *Attorney, Agent, or Firm* — Amin, Turocy & Watson, LLP

(57) ABSTRACT

The subject technology relates to automatic ejection of disk drives in a storage enclosure. An example method includes monitoring, using an embedded controller, an operational status of disk drives installed in respective slots of a storage enclosure. Based on the monitoring, a triggering event is detected, via the embedded controller, based on a defined criterion that identifies a disk drive of the disk drives. Further, a slot of the slots is identified, via the embedded controller, as being the slot into which the disk drive is installed. In response to identifying the slot, a disengagement process is activated, via the embedded controller, in relation to the slot. The disengagement process may include movement of a force-transfer arm, as a result of which a disengagement action is performed in relation to the slot, such as inserting the force-transfer arm into the slot to displace the disk drive.

20 Claims, 7 Drawing Sheets

AUTOMATIC EJECTION OF DISK DRIVES IN A STORAGE ENCLOSURE

BACKGROUND

In the field of data storage systems, storage enclosures are used to house multiple disk drives, such as hard disk drives (HDDs) or solid-state drives (SSDs). Storage enclosures are commonly used in data centers to provide scalable storage capacities for various applications. An aspect of effectively maintaining these systems is the ability to efficiently manage and replace disk drives when failures occur.

The above-described context with respect to conventional computing systems is merely intended to provide an overview of current technology and is not intended to be exhaustive. Other contextual description, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a storage enclosure is described herein. The storage enclosure may include slots configured to receive respective disk drives. The slots respectively may extend longitudinally between respective mouth ends of the slots and respective connector ends of the slots that oppose the respective mouth ends. The respective mouth ends may define respective openings for insertion of the respective disk drives into the slots. The respective connector ends may include respective receiver connectors usable to mate with respective drive connectors associated with the respective disk drives. The storage enclosure may further include a force-transfer arm usable to perform a disengagement action with respect to a slot of the slots. The storage enclosure may further include an embedded controller controllably linked to the force-transfer arm. The embedded controller may be configured to identify the slot from the slots based on detecting a triggering event in relation to the slot, and, in response to identifying the slot, activate the disengagement action with respect to the slot. The disengagement action may comprise an insertion of the force-transfer arm into an interior of the slot, the insertion resulting in displacement of a disk drive installed in the slot.

In an example embodiment, a method is described herein. The method may include monitoring, by a system using an embedded controller, an operational status of disk drives installed in respective slots of a storage enclosure. Each slot of the respective slots may extend longitudinally between a mouth end and an opposing connector end. The method may include, based on the monitoring, detecting, via the embedded controller, a triggering event based on a defined criterion that identifies a disk drive of the disk drives. The method may include identifying, via the embedded controller, a slot of the slots as being the slot into which the disk drive is installed. The method may include, in response to identifying the slot, activating, via the embedded controller, a disengagement process in relation to the slot. The disengagement process may include movement of a force-transfer arm, as a result of which a disengagement action is performed in relation to the slot. The disengagement action may include inserting the force-transfer arm into the slot to displace the disk drive.

In an example embodiment, a non-transitory machine-readable medium is described herein. The non-transitory machine-readable medium may include executable instructions that, when executed by at least one processor of a system, facilitate performance of operations. The operations may include monitoring, using an embedded controller of the system, an operational status of disk drives installed in respective slots of a storage enclosure. Each slot of the respective slots may extend longitudinally between an install end and an opposing connector end opposite the install end. The operations may include, based on the monitoring, detecting, using the embedded controller, a triggering event based on a defined criterion that identifies a disk drive of the disk drives. The operations may include identifying, using the embedded controller, a slot of the slots as being the slot into which the disk drive is installed. The operations may include, in response to identifying the slot, activating, using the embedded controller, a disengagement process in relation to the slot. The disengagement process may include movement of a force-transfer arm, as a result of which a disengagement action is performed in relation to the slot. The disengagement action may include inserting the force-transfer arm into the slot to displace the disk drive.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION

Figure 1:
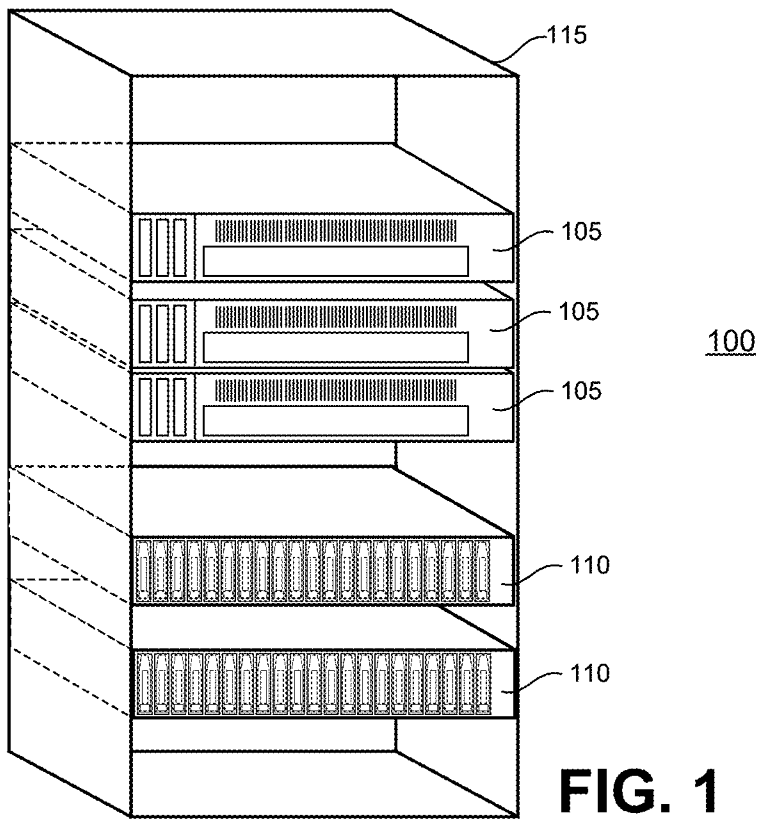
FIG. 1 illustrates an example system including devices that may utilize the techniques described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments. Like reference numerals have been used to illustrate like components across the figures.

In the field of data storage systems, storage enclosures are used to house multiple disk drives, such as hard disk drives (HDDs) or solid-state drives (SSDs). Storage enclosures are commonly used in data centers to provide vast, scalable storage capacities for various applications. An aspect of effectively maintaining these systems is the ability to efficiently manage and replace disk drives when failures occur.

Typically, when a disk drive fails, a service light is activated to signal the failure. A technician is then required to identify and remove the appropriate drive for replacement. However, this manual process carries the risk of human error, where the wrong drive might be removed. Such mistakes can lead to data unavailability or even data loss, significantly impacting the operation of the storage system. To mitigate this risk, example embodiments introduce techniques for automatically ejecting disk drives when a failure is detected. With this approach, the failed drive may be automatically ejected from the storage enclosure, resulting in the disk drive protruding from the storage enclosure. This allows a technician to easily identify and remove the failed drive without the risk of mistakenly removing the wrong one.

With reference now to FIG. 1, an exemplary system 100 includes an arrangement of devices in which various embodiments may be utilized. The system 100 may include several devices, such as one or more servers 105 and one or more storage enclosures 110, stacked within a device rack 115 to enhance space efficiency. The device rack 115 may include multiple slots, each capable of holding a unit of equipment, such as the illustrated servers 105 or storage enclosures 110. In general, the server 105 may provide resources or data to other computers, known as clients, over a network.

In example embodiments, the storage enclosure 110 may be a hardware unit that acts as a storage node within a network. The storage enclosure 110 may be designed to house multiple storage devices, such as hard drives (HDDs) or solid-state drives (SSDs), that provide scalable data storage. The storage enclosure 110 may be equipped with drive bays, power supplies, cooling systems, and often includes an embedded controller for managing and monitoring the storage devices. The storage enclosure 110 may connect to servers or networks via high-speed interfaces, enabling data transfer and access. In general, servers and storage enclosures may facilitate data processing, storage, and retrieval within a network, such as Network-Attached Storage (NAS) systems, Storage Area Networks (SANs), or others. In accordance with exemplary embodiments, the storage enclosure 110 may further include a mechanism for automatically ejecting disk drives, as discussed below.

Figure 2:
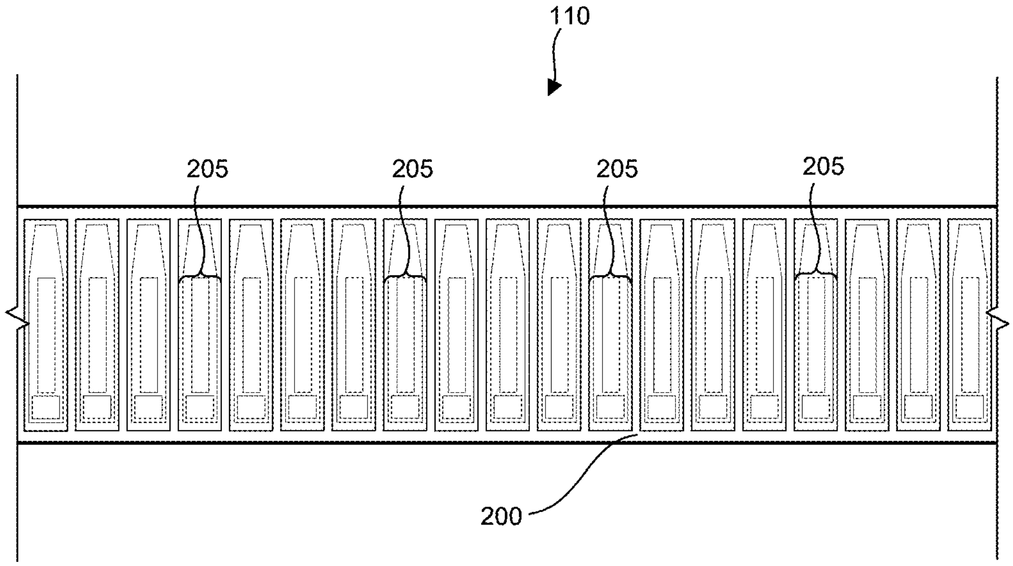
FIG. 2 illustrates the front panel of a storage enclosure according to various example embodiments.

With reference to FIG. 2, an illustration of a front panel 200 of a storage enclosure 110 is provided according to various embodiments. As shown, the storage enclosure 110 may include several drive bays or slots 205 aligned in a row across the front panel 200. Other configurations of the slots are also possible. Each slot 205 may be configured to receive a disk drive. In example embodiments, the storage enclosure 110 may be configured to automatically eject an installed disk drive when a triggering event is detected. In example embodiments, the triggering event may include determining that a disk drive installed in one of the slots 205 has a fault. The storage enclosure 110 may have more or fewer slots 205 in the row, or the storage enclosure 110 may include several stacked rows. Various connectors (not shown) may also be provided that facilitate the connection of peripheral devices and power sources.

Figure 3:
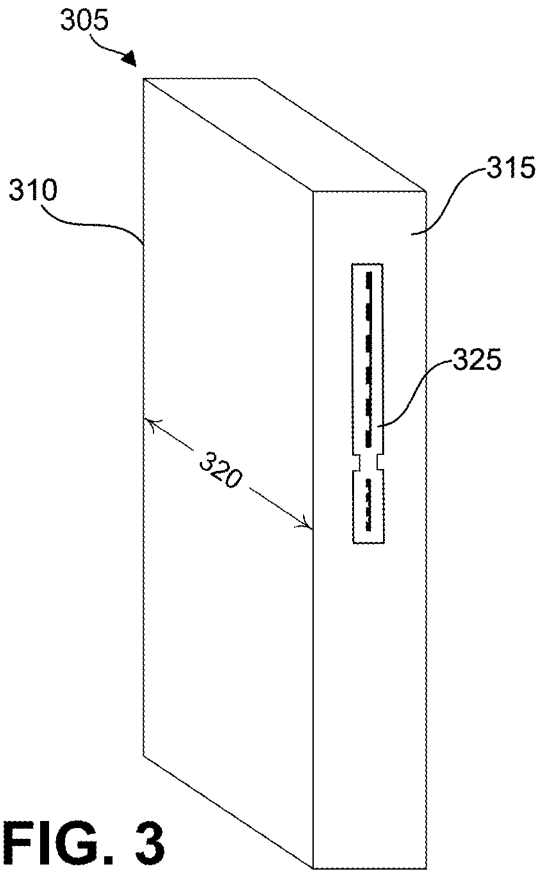
FIG. 3 illustrates a disk drive having a drive connector according to various example embodiments.

FIG. 3 illustrates a schematic representation of a disk drive 305 according to various example embodiments. As referenced herein, the disk drive 305 may extend between a first end 310 and a second end 315, with the distance between the first end 310 and the second end 315 constituting a length 320 of the disk drive 305. The disk drive 305 may include a drive connector 325 disposed on the second end 315. To install the disk drive 305 within a storage enclosure, the disk drive 305 is typically inserted within a designated slot of the storage enclosure with the second end 315 of the disk drive 305 leading. As discussed below, once fully inserted so to complete installation within the storage enclosure, the drive connector 325 operably engages a receiver connector defined within the storage enclosure.

Figure 4:
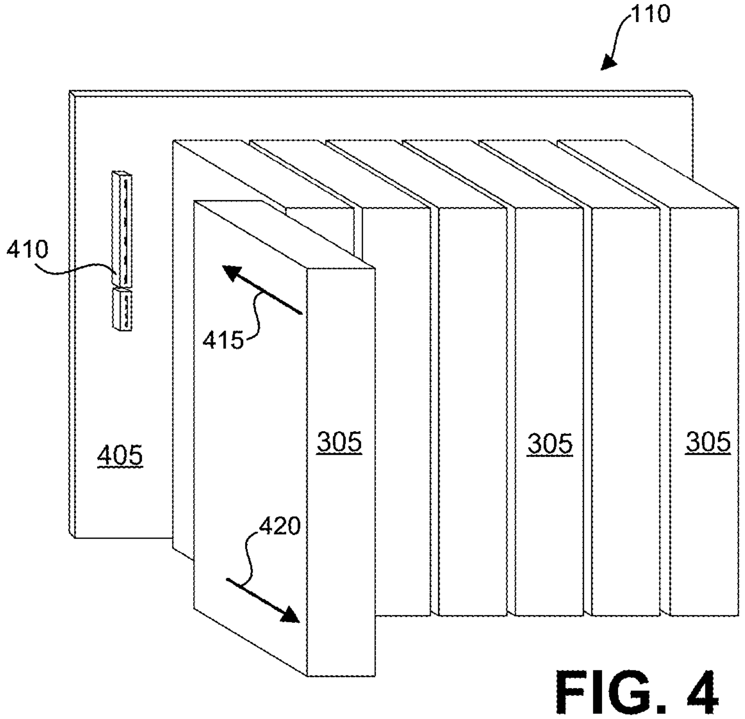
FIG. 4 is a schematic diagram of disk drives within a storage enclosure according to various example embodiments.

FIG. 4 is a partial view of a storage enclosure 110 depicting installed disk drives 305 according to various example embodiments. Within the storage enclosure 110, a backwall 405 may be formed that defines a termination point of the slots. The backwall 405 may include receiver connectors 410 for engaging respective drive connectors of the installed disk drives 305. Specifically, the receiver connectors 410 may be formed along the backwall 405 so that one corresponds with each slot. The receiver connector 410 may be configured to mate with a particular type of drive connector. The arrows 415, 420 indicate opposing directions of movement by which a disk drive 305 can be engaged in or disengaged from the storage enclosure 110. As referenced herein, the opposing directions may include an engagement direction 415, which is a direction of movement that moves the disk drive 305 toward the receiver connector 410, and a disengagement direction 420, which is a direction of movement that moves the disk drive 305 away from the receiver connector 410.

Figure 5:
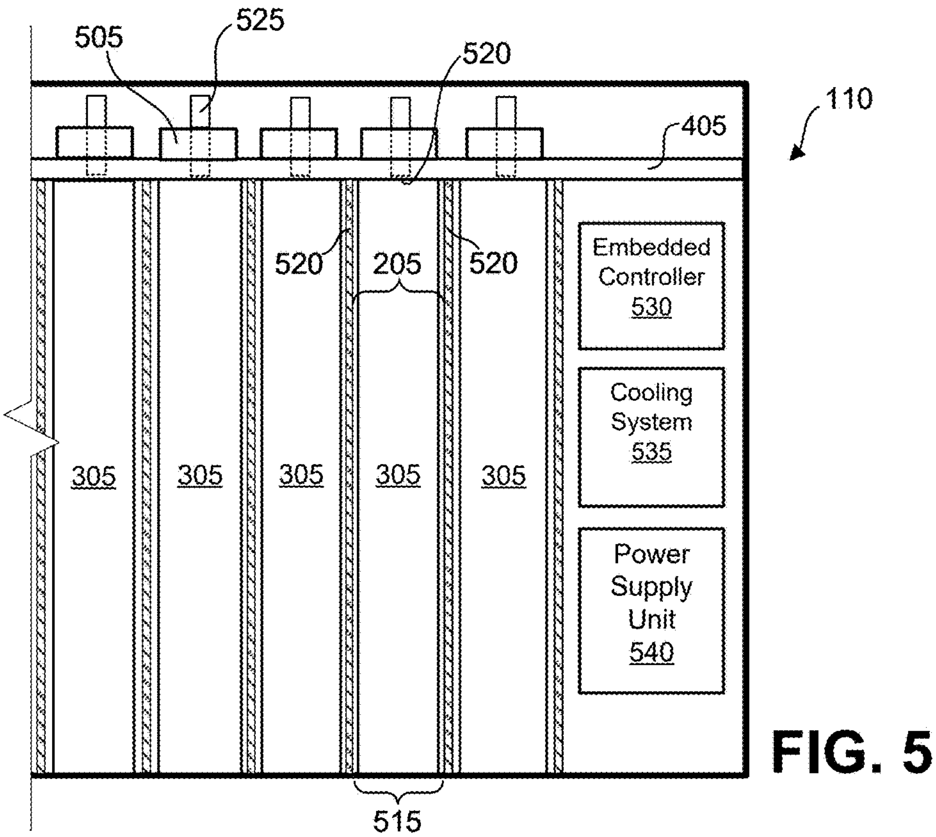
FIG. 5 is a schematic diagram of a storage enclosure with a disengagement mechanism according to various example embodiments.

FIG. 5 is a schematic diagram of a storage enclosure with a disengagement mechanism 505 for disk drives 305 according to various example embodiments. The storage enclosure 110 may include slots 205 configured to receive respective disk drives. Each slot 205 may extend longitudinally between a mouth end 515 and an opposing connector end 520. The mouth end 515 may define an opening for insertion of a disk drive 305 into the slot 205. The connector end 520 may be formed by the backwall 405 and include the receiver connector 410 usable to mate with a drive connector associated with a disk drive.

In example embodiments, the disengagement mechanism 505 may include a force-transfer arm 525. The force-transfer arm 525 may be configured to perform a disengagement action in relation to a corresponding one of the slots 205. The storage enclosure 110 may further include an embedded controller 530 controllably linked to the force-transfer arm 525 for activating the disengagement action. The embedded controller 530 may be configured to selectively identify slots for which the disengagement action is performed. The selective identification may be based on detecting a triggering event in relation to a given slot 205. In response to the identifying of the slot 205, the embedded controller 530 may activate the disengagement action with respect to the slot 205. In example embodiments, the disengagement action may include the insertion of the force-transfer arm 525 into an interior of the slot 205 where the insertion results in a displacement of a disk drive 305 installed in the slot 205. The storage enclosure 110 may further include a cooling system 535 and a power supply unit 540.

In example embodiments, each slot 205 may be configured to receive a corresponding disk drive 305. The slot 205 may extend longitudinally from the mouth end 515, which defines the opening for inserting the disk drive, to the connector end 520, which opposes the mouth end 515. Each slot 205 may be defined by sidewalls 520 that extend between the mouth end 515 and the connector end 520 of the slot 205. As indicated, a pair of the sidewalls may extend in parallel to define a given slot 205. The sidewalls 520 may be configured to restrict the disk drives 305 inserted within the slots 205 to movement in opposing directions. The opposing directions of movement may include movement of the disk drive 305 toward the connector end 520 of the slot 205 (i.e., in the engagement direction 415), and movement of the disk drive 305 away from the connector end 520 of the slot 205 (i.e., in the disengagement direction 420). In example embodiments, the storage enclosure 110 may include multiple slots 205. Any number of slots 205 may be included, for example, the storage enclosure 110 may have 10, 12, 24, 48 or more slots. In an example embodiment, the storage enclosure 110 has at least 24 slots 205. The slots 205 may be aligned in parallel within a single row. Several rows of slots may also be provided in the storage enclosure.

Figure 6:
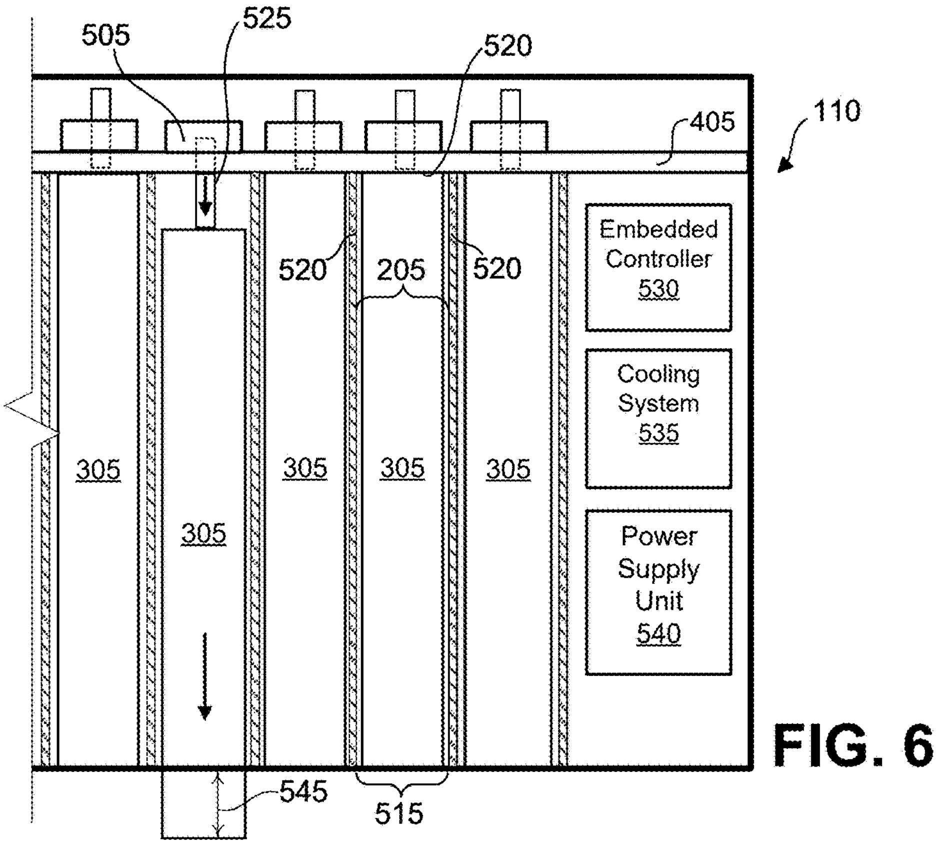
FIG. 6 is an alternative view of the storage enclosure of FIG. 5.

FIG. 6 illustrates a performance of a disengagement action with a force-transfer arm 525 in relation to a particular slot 205 according to various example embodiments. In example embodiments, the disengagement action may include the insertion of the force-transfer arm 525 into the slot 205, where the insertion extends the force-transfer arm 525 in the disengagement direction 420. The insertion may be configured to result in displacing the disk drive 305 in the disengagement direction 420. In example embodiments, the disengagement mechanism 505 includes a linear actuator that actuates to perform the insertion of the force-transfer arm 525 during the disengagement action. As shown, the disengagement mechanism 505 and the force-transfer arm 525 are disposed between the backwall 405 and an outer encasement of the storage enclosure 110. To reduce space requirements, in example embodiments, the linear actuator may be configured as a shape-memory alloy.

In example embodiments, before the disengagement action is performed, the force-transfer arm 525 may be disposed in an initial position that is exterior to the slot 205 and adjacent to or near the connector end 520 of the slot 205. The disengagement action may include the insertion of the force-transfer arm 525 into an interior of the slot 205 via an opening formed through the connector end 520 of the slot 205. In the example embodiments of FIGS. 5 and 6, the storage enclosure 110 may include multiple force-transfer arms 525, with the force-transfer arms 525 being respectively paired and disposed in proximity to the slots 205.

In example embodiments, the triggering event may include a notification received by the embedded controller 530 indicating that a fault has been detected in the disk drive 305 installed within the slot 205. The embedded controller 530 may activate the disengagement action in relation to the slot 205 by performing the disengagement action with the force-transfer arm 525 determined to correspond with the slot 205. That is, the embedded controller 530 selectively activates only the force-transfer arm 525 that corresponds to the slot 205 having the faulty disk drive.

For reference purposes, each pairing of disk drive 305 and slot 205 may be referred to as a disk drive-slot pairing. As will be appreciated, within a given disk drive-slot pairing, the installation of the disk drive 305 in the slot 205 may result in the first end 310 of the disk drive 305 becoming flush or substantially flush with the opening defined in a mouth end 515 of the slot 205. Further, the installation of the disk drive 305 in the slot 205 may result in the second end 315 of the disk drive 305 residing adjacent to the connector end 520 of the slot 205 and the connectors engaging. As shown in FIG. 6, the displacement of a given disk drive 305 may result in the first end 310 of the disk drive 305 protruding from the opening defined in the mouth end 515 of the slot 205. In example embodiments, the first end 310 of the disk drive 305 may protrude by at least a threshold distance 545. In example embodiments, the threshold distance 545 may be one that results in the drive connector 325 of the disk drive 305 disengaging from being operably mated with the receiver connector 410 of the slot 205. Alternatively, in example embodiments, the threshold distance may be based on a length of the disk drive (e.g., length 320 of FIG. 3). In example embodiments, the threshold distance 545 is greater than about 5% of the length 320 of the disk drive 305, and less than about 50% of the length 320 of the disk drive 305. In other embodiments, the threshold distance 545 is greater than about 15% of the length 320 of the disk drive 305, and less than about 35% of the length 320 of the disk drive.

Figure 7:
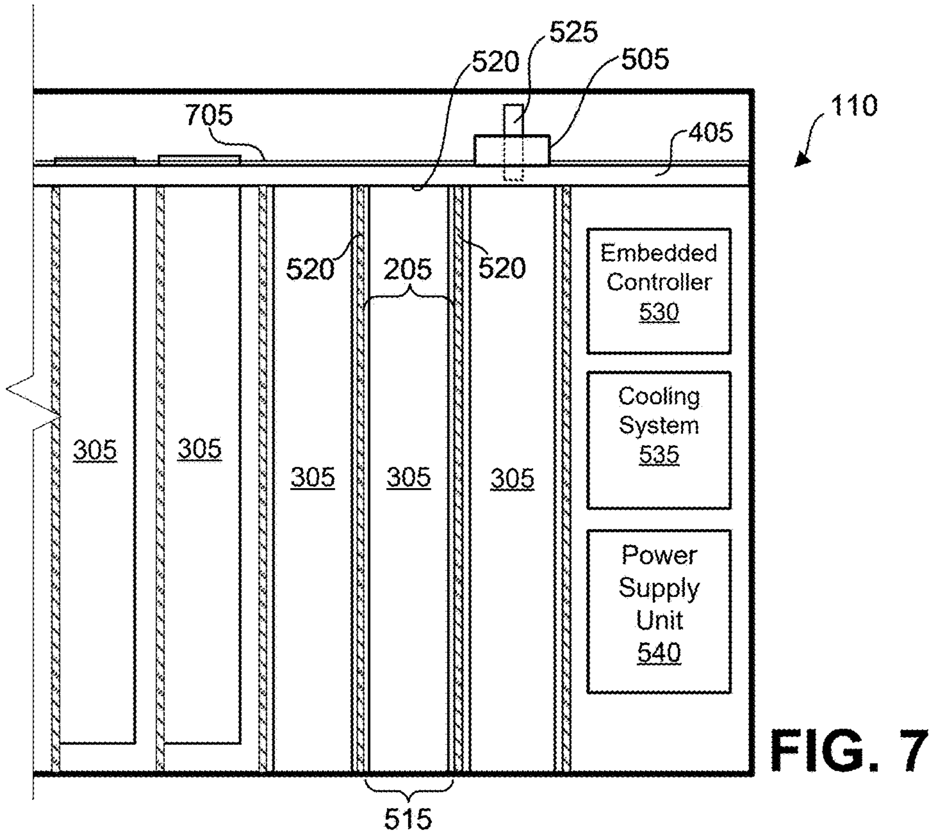
FIG. 7 is a schematic diagram of a storage enclosure with an alternative disengagement mechanism according to various example embodiments.
Figure 8:
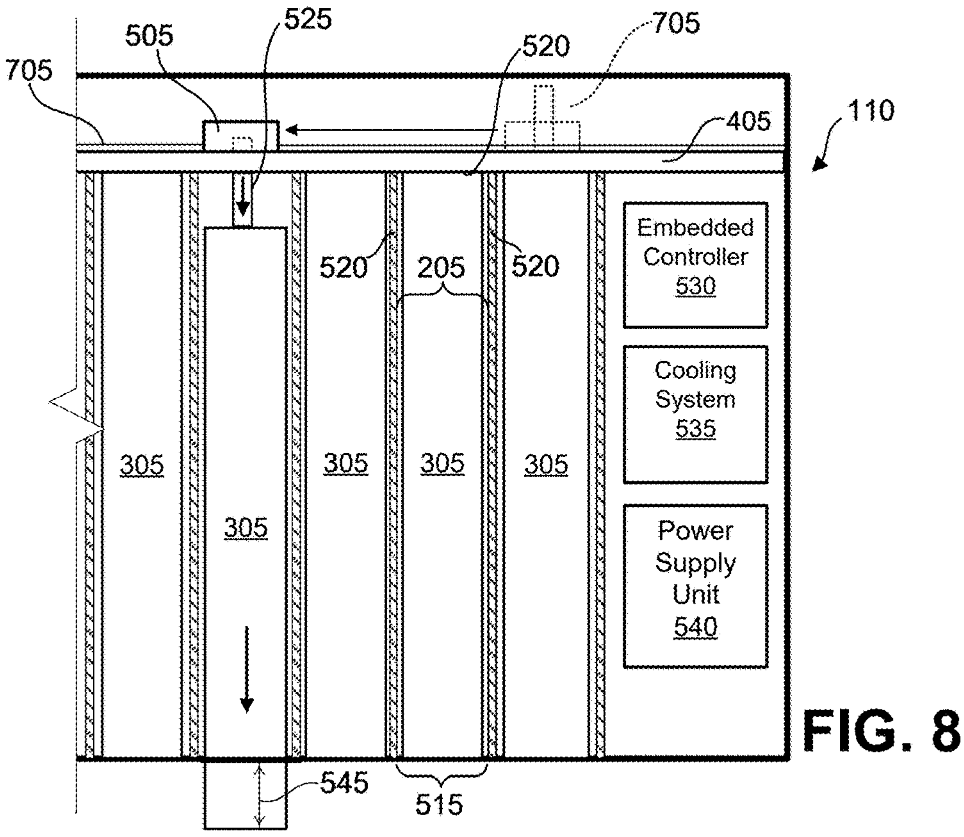
FIG. 8 is an alternative view of the storage enclosure of FIG. 7.

With reference now to FIGS. 7 and 8, an alternative arrangement for the disengagement mechanism 505 and the force-transfer arm 525 is illustrated according to various example embodiments. To avoid redundancy, the functionality and structure previously described in relation to FIGS. 5 and 6 will not be repeated here. It should be appreciated that the following concepts build upon those already detailed, as one skilled in the art would appreciate. Instead of having a force-transfer arm 525 for each slot 205 (as shown in FIGS. 6 and 7), the storage enclosure 110 controllably repositions the disengagement mechanism 505 and/or the force-transfer arm 525 in relation to a given one of the slots 205. Thus, in accordance with exemplary embodiments, a single force-transfer arm 525 may be configured to perform the disengagement action for more than one slot 205. In exemplary embodiments, as shown, the force-transfer arm 525 is repositionable so that it may service each of the slots 205 in the row.

In accordance with exemplary embodiments, a rail 705 may be disposed in spaced relation to the connector ends 520 of the slots 205. In certain embodiments, the rail 705 may be integrated with, for example, the backwall 405. The force-transfer arm 525 may slidably engage the rail 705 so that it may be moved. Specifically, the force-transfer arm 525 may be moved along the rail 705 in a manner controlled by the embedded controller 530 to selectively attain a specified alignment in relation to each slot 205, i.e., an alignment for performing the disengagement action in relation to that given slot 205. A triggering event may initiate the process. For example, as depicted in FIG. 7, the triggering event may include receiving a communication that notifies the embedded controller 530 that a disk drive 305 installed in a particular slot 205 has a fault. When this occurs, the embedded controller 530 may initiate the disengagement action with respect to the slot 205 by moving the force-transfer arm 525 via the rail 705 from a first position 710 to a second position. The second position may coincide with a specified alignment that corresponds to the slot 205 for performing a disengagement action in relation thereto. Once the second position is attained, the disengagement action may continue with the force-transfer arm 525 being inserted into the slot 205 so that the disk drive is disengaged and the first end 310 of the disk drive 305 protrudes from the opening of the mouth end 515 by at least the threshold distance 545.

Figure 9:
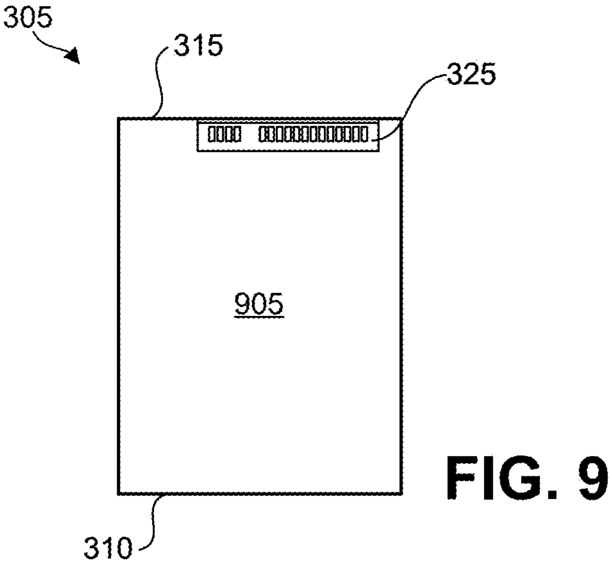
FIG. 9 illustrates a solid-state drive that may be used with various example embodiments.
Figure 10:
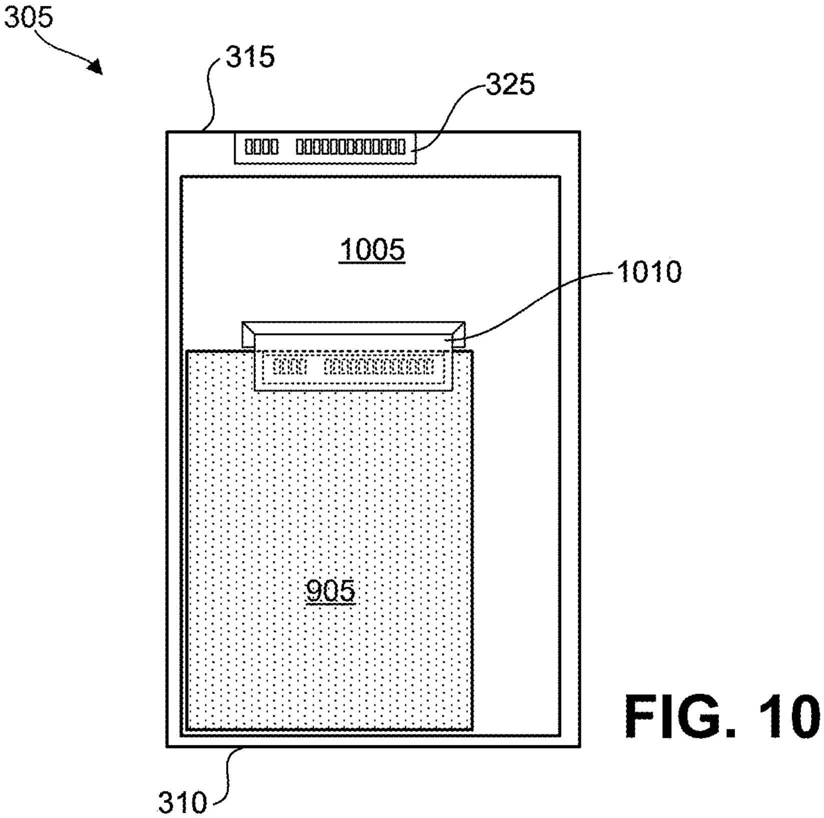
FIG. 10 illustrates a solid-state drive installed within an outer assembly that may be used with various embodiments of the present storage enclosure.

With reference now to FIGS. 9 and 10, it should be understood that exemplary embodiments of the disengagement mechanism may operate with different types of disk drives, including hard disk drives (HDDs) and solid-state drives (SSDs). Additionally, the disengagement mechanism may be adapted for use with various arrangements for installing disk drives. For instance, the disengagement mechanism may be applicable to storage enclosures where an installed disk drive engages the corresponding slot directly, which may include the disk drive depicted in FIG. 9. Additionally, the disengagement mechanism may be used in cases where an outer assembly is utilized to facilitate the engagement of a disk drive into a slot, which may include the disk drive depicted in FIG. 10.

With specific reference to FIG. 9, an exemplary solid-state drive 905 is shown that may be used with various example embodiments. In this case, the disk drive 305 simply includes an SSD having an integral outer encasement that forms the first end 310 and the second end 315 of the disk drive 305. In such cases, the on-drive connector of the SSD may serve as the drive connector 325 of the disk drive 305 formed at the second end 315 of the disk drive. During the disengagement action, the force-transfer arm 525 may insert through the connector end 520 of the slot 205 to engage the second end 315 of the disk drive 305 formed by the integral outer encasement of the SSD.

With specific reference to FIG. 10, an exemplary solid-state drive (SSD) 905 is shown that is installed within an outer assembly 1005, which also may be used in various embodiments of the present storage enclosure. In this case, the disk drive 305 of the present disclosure refers to the coupling between the SSD 905 and the outer assembly 1005. In example embodiments, the outer assembly 1005 may include a structure formed non-integrally with the SSD 905. The structure of the outer assembly 1005 may form the second end 315 of the disk drive 305 and the drive connector 325 disposed on the second end 315 of the disk drive. The structure may further include connectors 1010 that connect the drive connector 325 to an on-drive connector of the SSD 905. For example, the outer assembly 1005 may be part of an SSD carrier or SSD adapter that facilitates installation of the SSD 905 within a given slot. During the disengagement action, when the outer assembly 1005 is present, the force-transfer arm 525 may insert through the connector end 520 of the slot 205 to engage the outer assembly 1005 of the disk drive. It will be appreciated that, in example embodiments, any locking mechanisms pertaining to a disk drive within a given slot may be accounted for, i.e., unlocked or overcome, via the disengagement action.

Figure 11:
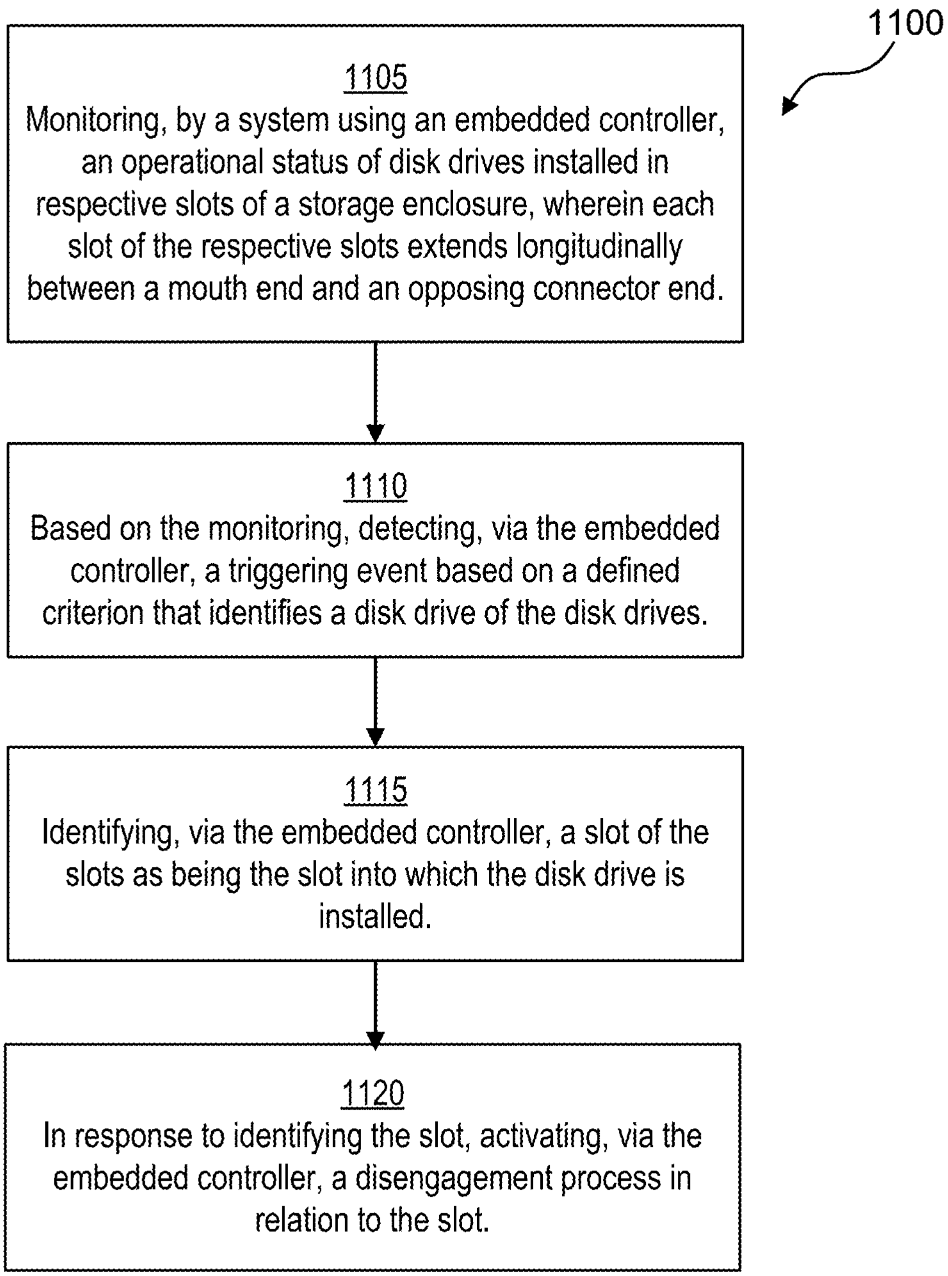
FIG. 11 illustrates a method for automatically ejecting disk drives installed within a storage enclosure according to various example embodiments.

Referring now to FIG. 11, a method 1100 is illustrated for automatically ejecting disk drives installed within a storage enclosure according to various example embodiments.

At 1105, the method 1100 may include the act of monitoring, by a system using an embedded controller, an operational status of disk drives installed in respective slots of a storage enclosure. Each slot of the respective slots may extend longitudinally between a mouth end and an opposing connector end.

At 1110, the method 1100 may include the act of, based on the monitoring, detecting, via the embedded controller, a triggering event based on a defined criterion that identifies a disk drive of the disk drives.

At 1115, the method 1100 may include the act of identifying, via the embedded controller, a slot of the slots as being the slot into which the disk drive is installed.

At 1120, the method 1100 may include the act of, in response to identifying the slot, activating, via the embedded controller, a disengagement process in relation to the slot. In example embodiments, the disengagement process may include movement of a force-transfer arm, as a result of which a disengagement action is performed in relation to the slot, wherein the disengagement action comprises inserting the force-transfer arm into the slot to displace the disk drive. In example embodiments, the performing of the disengagement action may include actuating a linear actuator to insert the force-transfer arm into the slot.

In example embodiments, the defined criterion identifies the disk drive as having a fault. As used herein, a fault may indicate a likelihood of the disk drive suffering an imminent failure according to a failure metric. Alternatively, the fault may indicate a likelihood that the disk drive is going to undergo an imminent failure within a specified time frame.

Figure 12:
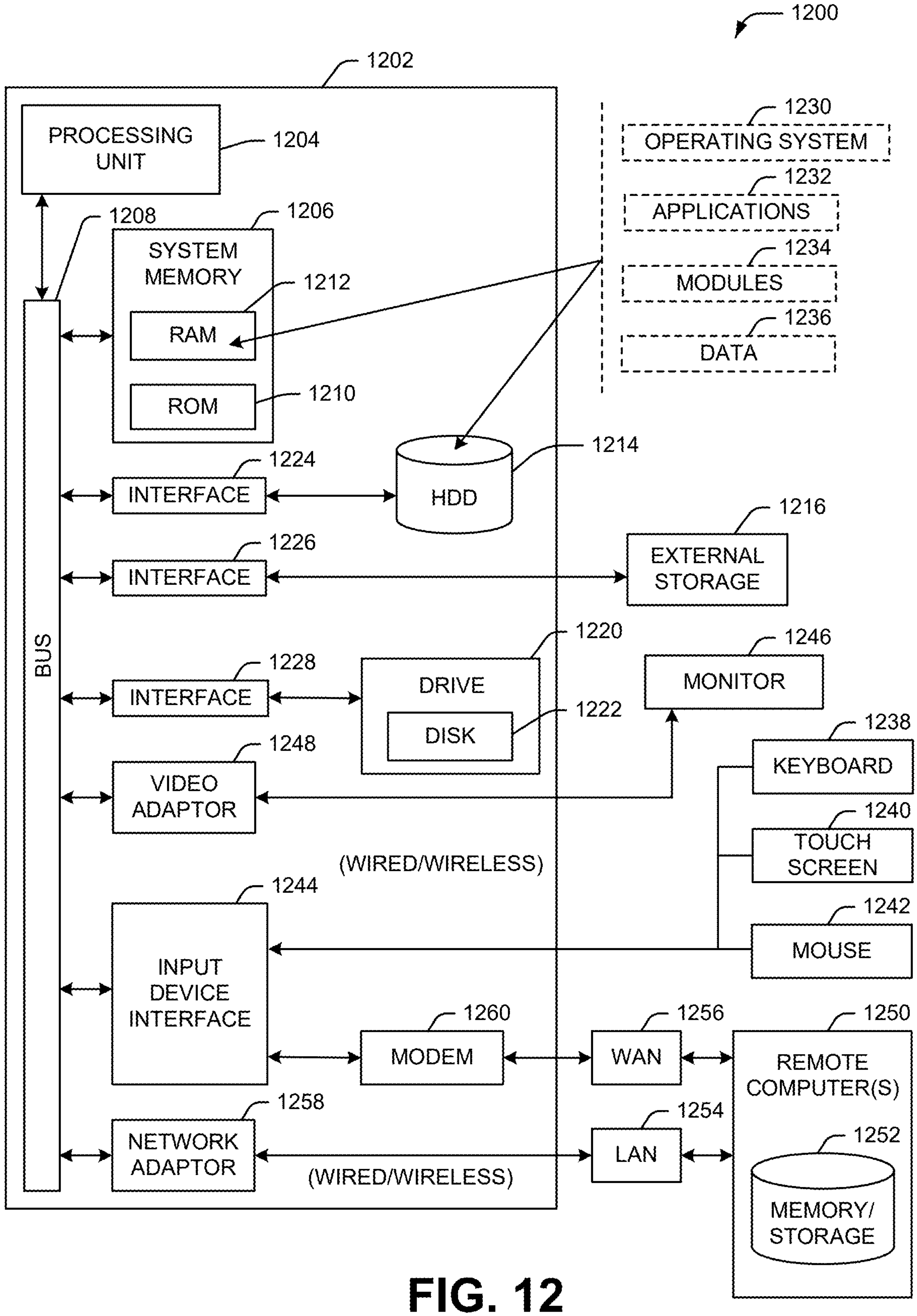
FIG. 12 is an example of an embodiment of a computer system that may utilize the techniques described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid state drive, an optical disk drive, which can read or write from a disk 1222, such as a CD-ROM disc, a DVD, a BD, etc. Alternatively, where a solid state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the . NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can also be connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

What is claimed is:

1. A storage enclosure, comprising:

slots configured to receive respective disk drives, wherein:

the slots respectively extend longitudinally between respective mouth ends of the slots and respective connector ends of the slots that oppose the respective mouth ends, the respective mouth ends define respective openings for insertion of the respective disk drives into the slots, and the respective connector ends comprise respective receiver connectors usable to mate with respective drive connectors associated with the respective disk drives;

a force-transfer arm usable to perform a disengagement action with respect to a slot of the slots; and an embedded controller controllably linked to the force-transfer arm, the embedded controller configured to identify the slot from the slots based on detecting a triggering event in relation to the slot, and, in response to identifying the slot, activate the disengagement action with respect to the slot, wherein the disengagement action comprises an insertion of the force-transfer arm into an interior of the slot, the insertion resulting in displacement of a disk drive installed in the slot.

2. The storage enclosure of claim 1, wherein the slots comprise respective sidewalls extending between the respective mouth ends and the respective connector ends, and wherein the respective sidewalls are configured to restrict the respective disk drives inserted within the slots to respective movement in opposing directions in which:

an engagement direction of the opposing directions comprises the respective movement of the respective disk drives toward the respective connector end of the slots, and a disengagement direction of the opposing directions comprises the respective movement of the respective disk drives away from the respective connector ends of the slots.

3. The storage enclosure of claim 2, wherein the disengagement action comprises the insertion of the force-transfer arm into the slot in the disengagement direction, the insertion resulting in the displacement of the disk drive in the disengagement direction, and wherein the slots comprise at least 10 slots and are aligned in parallel within a row having the at least 10 slots.

4. The storage enclosure of claim 3, further comprising:

a linear actuator that actuates to perform the insertion of the force-transfer arm, the linear actuator comprising a shape-memory alloy.

5. The storage enclosure of claim 3, wherein, before the disengagement action is performed, the force-transfer arm comprises an initial position that is exterior to the slot and adjacent to a connector end of the slot, and wherein the disengagement action comprises the insertion of the force-transfer arm into an interior of the slot via an opening formed through the connector end of the slot.

6. The storage enclosure of claim 1, further comprising:

the respective disk drives installed in the slots, each pairing of disk drive and slot being a disk drive-slot pairing, wherein each disk drive of the respective disk drives comprises a first end and a second end opposing the first end, wherein, for each disk drive-slot pairing, installation of the disk drive in the slot results in the first end of the disk drive becoming flush or substantially flush with an opening defined in a mouth end of the slot and further results in a second end of the disk drive becoming adjacent to a connector end of the slot, and wherein the displacement of the disk drive comprises a protrusion of the first end of the disk drive from the opening defined in the mouth end of the slot by at least a threshold distance.

7. The storage enclosure of claim 6, wherein, for each disk drive-slot pairing, the disk drive comprises a drive connector formed at the second end that operably mates with a receiver connector of the slot, and wherein the protrusion by at least the threshold distance results in the drive connector of the disk drive disengaging from being operably mated with the receiver connector of the slot.

8. The storage enclosure of claim 6, wherein, for each disk-drive pairing, a distance between the first end and the second end of the disk drive comprises a length of the disk drive; and wherein the threshold distance is:

greater than about 5% of the length of the disk drive, and less than about 50% of the length of the disk drive.

9. The storage enclosure of claim 6, wherein, for each disk-drive pairing, a distance between the first end and the second end of the disk drive comprises a length of the disk drive; and wherein the threshold distance is:

greater than about 15% of the length of the disk drive, and less than about 35% of the length of the disk drive.

10. The storage enclosure of claim 6, wherein, for each disk-drive pairing, the disk drive comprises a solid-state drive (SSD) having an integral outer encasement that forms the first end and the second end of the disk drive, wherein, for each disk-drive pairing, a drive connector of the disk drive comprises an on-drive connector formed at the second end of the disk drive, and wherein:

before the disengagement action is performed, the force-transfer arm comprises an initial position that is exterior to the slot and adjacent to the connector end of the slot; and during the disengagement action, the force-transfer arm inserts through the connector end of the slot to engage the second end of the disk drive formed by the integral outer encasement.

11. The storage enclosure of claim 6, wherein, for each disk-drive pairing, the disk drive comprises a coupling between a solid-state drive (SSD) and an outer assembly, the outer assembly comprising a structure formed non-integrally with the SSD, and wherein the structure comprises:

the second end of the disk drive and a drive connector formed on the second end, and connectors that connect the drive connector to an on-drive connector of the SSD.

12. The storage enclosure of claim 11, wherein the outer assembly comprises one of an SSD adapter or an SSD carrier that facilitates installation of the SSD within the slot, and wherein:

before the disengagement action is performed, the force-transfer arm comprises an initial position that is exterior to the slot and adjacent to the connector end of the slot, and during the disengagement action, the force-transfer arm inserts through the connector end of the slot to engage the outer assembly of the disk drive.

13. The storage enclosure of claim 6, further comprising force-transfer arms, the force-transfer arms being respectively paired and disposed in proximity to the slots, wherein the triggering event comprises a notification received by the embedded controller indicating that a fault has been detected in the disk drive installed within the slot, and wherein the embedded controller activates the disengagement action in relation to the slot by performing the disengagement action with one of the force-transfer arms determined to correspond with the slot.

14. The storage enclosure of claim 6, wherein the slots are aligned parallel within a row, and further comprising:

a rail disposed in spaced relation to the respective connector ends of the slots, wherein the force-transfer arm is controllably movable along the rail by the embedded controller to selectively attain respective specified alignments in relation to the slots, wherein the triggering event comprises receiving a communication that notifies the embedded controller that the disk drive installed in the slot has a fault, and wherein the embedded controller initiates the disengagement action with respect to the slot by moving the force-transfer arm to a position on the rail coinciding with a specified alignment, of the specified alignments, corresponding to the slot.

15. A method, comprising:

monitoring, by a system using an embedded controller, an operational status of disk drives installed in respective slots of a storage enclosure, wherein each slot of the respective slots extends longitudinally between a mouth end and an opposing connector end;

based on the monitoring, detecting, via the embedded controller, a triggering event based on a defined criterion that identifies a disk drive of the disk drives;

identifying, via the embedded controller, a slot of the slots as being the slot into which the disk drive is installed; and in response to identifying the slot, activating, via the embedded controller, a disengagement process in relation to the slot, the disengagement process comprising movement of a force-transfer arm, as a result of which a disengagement action is performed in relation to the slot, wherein the disengagement action comprises inserting the force-transfer arm into the slot to displace the disk drive.

16. The method of claim 15, wherein the performing of the disengagement action comprises actuating a linear actuator to insert the force-transfer arm into the slot, and wherein the defined criterion identifies the disk drive as having a fault.

17. The method of claim 16, wherein the fault indicates a likelihood of the disk drive suffering an imminent failure according to a failure metric.

18. A non-transitory machine-readable medium, comprising executable instructions that, when executed by at least one processor of a system, facilitate performance of operations, comprising:

monitoring, using an embedded controller of the system, an operational status of disk drives installed in respective slots of a storage enclosure, wherein each slot of the respective slots extends longitudinally between an install end and an opposing connector end opposite the install end;

based on the monitoring, detecting, using the embedded controller, a triggering event based on a defined criterion that identifies a disk drive of the disk drives;

identifying, using the embedded controller, a slot of the slots as being the slot into which the disk drive is installed; and in response to identifying the slot, activating, using the embedded controller, a disengagement process in relation to the slot, the disengagement process comprising movement of a force-transfer arm, as a result of which a disengagement action is performed in relation to the slot, wherein the disengagement action comprises inserting the force-transfer arm into the slot to displace the disk drive.

19. The non-transitory machine-readable medium of claim 18, wherein the performing of the disengagement action comprises actuating a linear actuator to insert the force-transfer arm into the slot; and wherein satisfaction of the defined criterion identifies the disk drive as having a fault.

20. The non-transitory machine-readable medium of claim 19, wherein the fault indicates a likelihood that the disk drive is going to undergo an imminent failure within a specified time frame.

* * * * *